United States Patent

Aronoff et al.

[11] 4,078,114
[45] Mar. 7, 1978

[54] WIRE COATED WITH DIALLYL ESTERS OF DICARBOXYLIC ACIDS

[75] Inventors: Elihu J. Aronoff, Framingham; Kewal Singh Dhami, Shrewsbury, both of Mass.

[73] Assignee: International Telephone and Telegraph Corporation, New York, N.Y.

[21] Appl. No.: 797,487

[22] Filed: May 16, 1977

Related U.S. Application Data

[60] Division of Ser. No. 670,693, Mar. 26, 1976, Pat. No. 4,051,003, which is a continuation of Ser. No. 489,697, Jul. 18, 1974, abandoned, which is a division of Ser. No. 401,973, Oct. 1, 1973, abandoned.

[51] Int. Cl.$^2$ .......................... B32B 15/08; C08F 8/00
[52] U.S. Cl. .............................. 428/379; 260/31.8 F; 428/421; 428/422
[58] Field of Search .................. 526/18, 56, 254; 204/159.17; 428/379, 383, 421, 422; 260/31.8 F, 884

[56] References Cited

U.S. PATENT DOCUMENTS

| | | | |
|---|---|---|---|
| 3,011,995 | 12/1961 | Smith | 526/56 X |
| 3,269,862 | 8/1966 | Lanza et al. | 428/421 X |
| 3,661,839 | 5/1972 | Klopfer | 260/884 X |
| 3,676,192 | 7/1972 | Hahn | 428/422 |
| 3,763,222 | 10/1973 | Aronoff et al. | 260/31.8 F |
| 3,839,261 | 10/1974 | Aronoff et al. | 260/31.8 F |
| 3,894,118 | 7/1975 | Aronoff et al. | 526/254 X |
| 3,911,192 | 10/1975 | Aronoff et al. | 428/379 |

*Primary Examiner*—Lorraine T. Kendell
*Attorney, Agent, or Firm*—J. B. Raden; H. J. Holt

[57] ABSTRACT

Diallyl esters of dicarboxylic acids are provided corresponding to the formula:

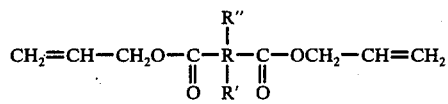

wherein R is an organic radical containing from 4 to 20 carbon atoms and is selected from the group consisting of alkyl radicals, cycloalkyl radicals, mixed alkyl-cycloalkyl radicals and aralkyl radicals; R' and R" are independently selected from hydrogen, alkyl, cycloalkyl, aralkyl and aryl radicals and mixtures thereof; and the total carbon atoms in R, R' and R" is from 10 to 34. These diallyl esters are crosslinking coreactants for polymeric compositions and expecially high temperature processing fluorocarbon polymers. The crosslinked compositions are particularly useful for insulation coatings.

2 Claims, No Drawings

WIRE COATED WITH DIALLYL ESTERS OF DICARBOXYLIC ACIDS

This is a division of application Ser. No. 670,693 filed Mar. 26, 1976, now U.S. Pat. No. 4,051,003 which in turn is a continuation of application Ser. No. 489,697, filed July 18, 1974, now abandoned, which in turn is a division of application Ser. No. 401,973, filed Oct. 1, 1973, also now abandoned.

This invention relates to diallyl esters of dicarboxylic acids and more specifically to diallyl esters of aliphatic dicarboxylic acids and their use as crosslinking coreactants for fluorocarbon polymers.

It is known that high temperature resistant fluorocarbon polymers possess a combination of mechanical, dielectric and chemical properties making them particularly useful as electrical insulation materials. However, in order to mazimize utilization of these fluorocarbon polymers under high temperature or overload conditions, crosslinking of the polymers is required to further increase their deformation resistance and toughness.

Crosslinking of high temperature resistant fluorocarbon polymers has presented a continuing problem since the polymers are normally processed at relatively high temperatures and chemical crosslinking agents effective under these conditions are seriously limited. For example, it is not feasible to melt process fluorocarbon polymers such as ethylene-tetrafluoroethylene or ethylene-chlorotrifluoroethylene copolymers prior to crosslinking by employing known chemical crosslinking agents and techniques since the chemical crosslinking systems prereact during the high temperature melt processing required for extrusion of these polymers. As a result of this prereaction, these agents are not available to provide crosslinking of the extruded products and, thus, effective crosslinking cannot be achieved. As an alternative to chemical crosslinking, irradiation crosslinking of these polymers has been studied. However, although some crosslinking of these polymers can be achieved by subjecting them to relatively massive doses of irradiation, the resulting crosslinked products are not commercially acceptable on the basis of cost and overall product properties. Accordingly, it would be highly desirable and commercially important to provide suitable cross-linking coreactants for use with fluorocarbon polymers which would enable cross-linking of these polymers with moderate doses of irradiation subsequent to high temperature processing as encountered in extrusion and certain molding techniques.

We have now found a new class of crosslinking compounds which are stable through all of the melt processing operations and readily form homogenous irradiation crosslinked systems. Processing temperatures even in excess of 700° F can be used without significant and detrimental thermal prereaction or volatilization during a melt processing procedure such as extrusion prior to irradiation activated curing.

The crosslinking coreactant compounds for use in the present invention are in general the diallyl esters of dicarboxylic acids corresponding to the structural formula:

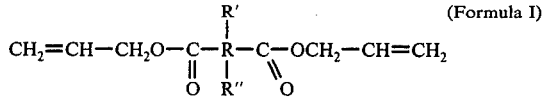

(Formula I)

wherein R is an organic radical containing from 4 to 20 carbon atoms and is selected from the group consisting of alkyl radicals, cycloalkyl radicals, mixed alkyl-cycloalkyl radicals and aralkyl radicals; R' and R" are independently selected from hydrogen, alkyl, cycloalkyl, aralkyl and aryl radicals and mixtures thereof; and the total carbon atoms in R, R' and R" is from 10 to 34.

In Formula I, it is preferred but not necessary, for the carbonyl carbon of the alkyloxy carbonyl group to be linked to an alkyl carbon. Additionally, when R in Formula I is an aralkyl, or when R' or R" are aryl or aralkyl radicals; it is preferred that the ratio of aromatic carbons to aliphatic (or alicyclic) carbons in R, R' and R" be less than about 3:1, and most preferably less than about 2:1.

These compounds possess a combination of desirable properties making them uniquely suitable for use as crosslinking coreactants for fluorocarbon polymers. Their volatility is sufficiently low and their stability sufficiently high to avoid problems during the high temperature processing and fabricating operations of the polymers. They have been found to exhibit surprisingly effective and desirable plasticizing action for the polymers during the processing, enabling lower processing temperatures to be used and generally facilitating extrusion or molding of the polymers. The crosslinking compounds permit irradiation at relatively low irradiation levels and result in crosslinked compounds of outstanding electrical and mechanical properties, particularly elevated temperature deformation resistance.

Examples of particularly suitable compounds within the scope of the invention are the diallyl esters of dodecanedioic and brassylic acids. In the latter esters, R is a simple aliphatic chain containing 10 and 11 carbon atoms, respectively, and R' and R" are hydrogen atoms in Formula I above. Other examples of preferred diallyl esters for use in the present invention are those prepared from bis (bicyclohexane carboxylic acid) where R is a bicycloalkyl radical containing 12 carbon atoms. Esters of "Dimer Acids" are also useful. These are acids produced by the acid catalyzed dimerization of natural 18 carbon fatty acids. In these compounds, R predominantly has a carbon-carbon double bond and an alicyclic ring in the otherwise aliphatic chain. The acid has the generalized structural formula:

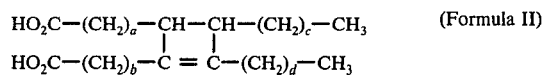

(Formula II)

and an ester produced with the acid of Formula II would correspond to the structure of Formula I where R is:

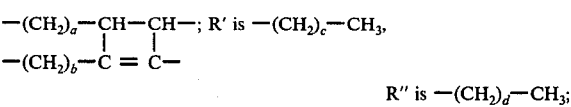

R" is $-(CH_2)_d-CH_3$;

and the sum of $a$, $b$, $c$ and $d$ is an integer from 4 to 28.

Other examples of compounds suitable for use in the present invention are the diallyl esters of hexadecanedioic acid; octadecandioic acid; diundecylenic acid; tricyclodecane dicarboxylic acid; p-menthane dicarboxylic acid; 1,2-dicyclohexylethane-4,4'-dicarboxylic acid; 2,2,3,2',2',3'-hexamethyldicyclopentyl-3,3'-dicarboxylic acid; 1,2,2-trimethylcyclopentane carboxylic 3-β-propionic acid; methyl homocamphoric acid; β-ethyl homocamphoric acid; 2,6-dibutyl pimelic acid; α-n-octyl sebacic acid; β-methyl-α-allyl adipic acid; 2,2,5,5-tetramethylhexene-3-dicarboxylic acid; 3,4-diisopropylhexene-3-α-dicarboxylic acid; α,α,α',α'-tetramethyl-β,β'-diphenyl adipic acid; 2,2,3-trimethyl-3-carboxycyclopentylphenyl acetic acid; 2,6-dibenzylpimelic acid; 1,3-diphenylcyclobutane bis (α-phenyl propionic acid); 1,4,1',4'-tetramethyl-5,8,5',8'-tetrahydrodinaphthyl-2,2'-dipropionic acid; and the like.

We have found that these compounds possess excellent properties as plasticizing and as crosslinking agents for high temperature processing fluorcarbon polymers, including homopolymers and copolymers such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluororpopylene copolymers, vinylidine fluoride-hexafluoropropylene-tetrafluoroethylene copolymers and the like. The crosslinking agent will normally be added to the fluorocarbon polymer in amounts of about 0.5 to 20 parts by weight per 100 parts by weight of the polymer.

In general, the crosslinking compounds of the invention may be prepared by reacting a suitable dicarboxylic acid with an excess of thionyl chloride and then reacting the diacid chloride reaction product with an excess of allyl alcohol. The dicarboxylic acid precursors have been known previously and are either commercially available or syntheses have been depicted in the literature.

The following examples illustrate the preparation of diallyl esters suitable for use in the present invention.

EXAMPLE I

This example illustrates the preparation of diallyl brassylate (diallyl ester of 1,13-tridecanedioic acid), a linear saturated alkyl diallyl ester.

Three hundred grams (1.23 moles) of commercially available brassylic acid and 270 ml. (442g., 3.72 moles) of thionyl chloride were refluxed for 8 hours and the excess thionyl chloride stripped off under atmospheric pressure and finally at the water aspirator. The diacyl chloride and 225 ml. (192g., 3.31 moles) of allyl alcohol were then refluxed for 4 hours and the fluid mass poured into water. After washing with water, dilute aqueous sodium carbonate and again with water, the distillate boiling at 180° C/1mm. was collected. The 160 g. yield of medium straw colored liquid represents a 40% yield.

EXAMPLE II

This example illustrates the preparation of a mixed unsaturated alkylcycloalkyl diallyl ester, i.e., the diallyl ester of a "Dimer Acid".

Five hundred grams (0.885 mole) of a dimerized fatty acid (Emery Industries "Empol 1010", averaging 35 carbons for a molecular weight of 565) and 264 g. (2.5 moles) of thionyl chloride were refluxed overnight and the excess thionyl chloride removed at atmospheric pressure and finally at the water aspirator. After addition of 129 g. (2.5 moles) of allyl alcohol to the diacyl chloride, the mixture was again refluxed for 6 hours and poured into water. Washing with aqueous sodium carbonate and water was followed by vacuum distillation at 166° C/0.8 Torr. The 110 g. collected represents a 15.5% yield of the diester.

EXAMPLE III

This example illustrates the preparation of an alicyclic saturated diallyl ester, the diallyl ester of bis (bicyclohexane carboxylic acid).

The dimethyl ester of diphenic acid was catalytically reduced, the ester hydrolyzed and the isolated bis (bicycohexane carboxylic acid) was heated to obtain the stable isomer melting at 353°–355° C according to the method described in U.S. Pat. No. 3,325,538.

Forty grams (0.157 mole) of the bis (bicyclohexane carboxylic acid) and 56 g. (0.47 mole) of thionyl chloride were heated gently over a mantle overnight and refluxed for 4 additional hours. The excess thionyl chloride was stripped at atmospheric pressure and finally at the water aspirator. Fifty-five grams (0.47 mole) of allyl alcohol were added dropwise to the mixture over a 3 hour period with the reaction temperature not allowed to rise above 80° C. The solution was then heated at reflux for another 3 hours, washed successively with water, dilute sodium carbonate and water. A 36 g. fraction collected at 173°–176° C/1.55 mm. represents a 62% conversion of the diacid to the diallyl ester.

EXAMPLE IV

This example illustrates the preparation of a branched aliphatic diallyl ester, the diallyl ester of 2,6-dibutyl pimelic acid.

Ethyl-n-butyl malonate was prepared by the procedure of Adams and Kamm in Organic Syntheses; Collective Volume I, pgs. 250-1, Second Edition, 1967, John Wiley and Sons, Inc. The isolated ethyl-n-butyl malonate was then alkylated with trimethylene bromide and the procedure of Leonard and Robinson carried out through the hydrolysis and decarboxylation of the dibasic acid (J. Am. Chem. Soc. 75, 2143 (1953). The acid was dissolved in aqueous potassium hydroxide, reprecipitated with hydrochloric acid, triturated with water and filtered and oven dried. It melted at 106°–107.5° C (Hall, Mahboob and Turner, J. Chem. Soc. 1950, 1842 report a melting point of 107°–8° C).

Then 54.5 g. (0.2 mole) of the 2,6-dibutyl pimelic acid, was reacted with 60 g. (0.50 mole) of thionyl chloride and refluxed for 8 hours and the excess thionyl chloride stripped off under atmospheric pressure and finally at the water aspirator. To the diacyl chloride in 200 ml. of benzene, 31.9 g. (0.55 mole) of allyl alcohol was added dropwise under reflux and heating continued for another hour. The cooled solution was washed with aqueous sodium carbonate and water, and dried over sodium sulfate. Removal of solvent at atmospheric pressure and finally distillation under vacuum yielded 52.8 g. (75% of the theoretical) of product boiling at 176°–178° C/0.7 mm.

EXAMPLE V

This example illustrates the preparation of a mixed alkyl-aryl diallyl ester, the diallyl ester of 2,6-dibenzyl pimelic acid.

The diacid precursor was obtained by the same two stage alkylation procedure as described in Example IV using benzyl bromide instead of butyl bromide in the first stage. A small sample recrystallized from cyclohexane melted at 134°–6° C (c.f., 137° C. reported by Leonard and Robinson, J. Am.Chem. Soc. 75,2143(1953).

Then, 34.0 g. (0.1 mole) of the 2,6-dibenzyl pimelic acid was reacted first with 30 g. (0.25 mole) of thionyl chloride and then, in 100 ml. of benzene, with 17.5 g.

(0.3 mole) of allyl alcohol under the same conditions as described in Example IV. The product fraction of 34.5 g. (82% of the theoretical diester) was collected at 184°-186° C/0.6 mm.

The compounds of the invention possess several particularly desirable properties for the high temperature processing of fluorocarbon resins. Thermal analytical testing has shown that these compounds have excellent thermal stability and low volatility and thus can withstand the relatively high temperature involved in molding, extruding or otherwise processing the polymers. In addition, they act to plasticize the fluorocarbons. Previous reported data indicates that many of the fluorocarbon resins have high resistance to solvation and swelling. The following table illustrates the decrease in torque achieved by the incorporation of the diallyl ester of brassylic acid into a copolymer of ethylene-tetrafluoroethylene. Comparisons are given showing equivalent torque readings for no additive and for a known crosslinking compound, triallyl cyanurate.

TABLE 1

| Polymer | Additive | Weight of Additive | Mixing Temp °F | Torque[1] (Meter-Grams) |
|---|---|---|---|---|
| Ethylene-tetrafluor-ethylene copolymer | None | — | 580 | 900 |
| Ethylene-tetrafluor-ethylene copolymer | TAC[2] | 5 | 580 | 1100 |
| Ethylene tetrafluor-ethylene copolymer | DAB[3] | 5 | 580 | 775 |

[1]The torque readings were taken in a "Brabender" sigma type mixer using a 70 gram charge in each case employing the noted temperature at a shear rate of 80 rpm.
[2]Triallyl cyanurate.
[3]Diallyl brassylate.

Table I indicates that triallyl cyanurate, the only crosslinking compound presently commercially used with a high temperature processing polymer is an antiplasticizer — the torque values are higher than the control. The lower torque values with the diallyl ester of the invention makes possible the extrusion of clear and homogenous fluorocarbon copolymers and permits marked reductions in extrusion temperatures. With triallyl cyanurate, good extrusions have not yet been obtained.

EXAMPLE VI

Samples of compositions were prepared by blending an ethylene-tetrafluoroethylene copolymer powder with 3% by weight of liquid diallyl brassylate, prepared as set forth in Example 1. MgO, 1% by weight, was blended into the composition. The blended compositions were then compression molded at 510°-520° F and subjected to irradiation at 20 megarad dose under a 1.5 MEV electron beam accelerator to produce a cross linked composition having the following mechanical properties at 250° C.

| Tensile Strength | 400 psi |
|---|---|
| Elongation (at 10" minute stretch) | 205% |
| Hot Modulus* (%, 275° C, 50 psi) | 39 |

*The hot modulus test indicates the percentage extension of a sample strip of crosslinked polymer after heating the polymeric composition at 275° C, and applying a 50 psi stress to the crosslinked composition while it is at this elevated temperature and subsequently cooling of the composition to room temperature.

EXAMPLE VII

Samples of the composition of Example VI were irradiated at 20 megarads and aged at 200° C. They were then tested for tensile strength and elongation after cooling to room temperature—about 25° C. The results were as follows:

TABLE II

|  | AGING PERIOD IN DAYS | | | | | | |
|---|---|---|---|---|---|---|---|
|  | 0 | 1 | 3 | 5 | 7 | 15 | 21 |
| Tensile Strength (psi) | 5785 | 5930 | 5146 | 5283 | 5380 | 4606 | 4860 |
| Retention T.S. (90) | — | — | — | — | 93 | 80 | 84 |
| Elongation at 10"/minute | 205 | 267 | 192 | 229 | 250 | 200 | 192 |

EXAMPLE VIII

This example and the following example illustrate the excellent mechanical and aging properties possessed by crosslinked ethylene-chlorotrifuloroethylene compositions of the present invention.

A polymeric composition was prepared by blending an ethylene-chlorotrifluoroethylene copolymer with 6% (by weight) diallyl brassylate.

The blended mixture was then compression molded at 490° F and subjected to a 10 megarad irradiation under a dose 1.5 MEV electron beam accelerator to produce a crosslinked polymeric composition having the following mechanical properties at 250° C temperature (above the melting point of the uncrosslinked polymer):

Tensile Strength 168 psi
Elongation (at 10 inches/minute stretch) 155%
Hot Modulus (%, 250° C, 50 psi) 52

EXAMPLE IX

Samples of the irradiation crosslinked compositions of Example VIII were aged at 200° C and tested for tensile strength and elongation after cooling to room temperature (about 25° C). The results of these tests, demonstrating the superior aging qualities possessed by polymeric compositions containing a diallyl brassylate crosslinking coreactant, were as follows:

TABLE III

| TEST | AGING PERIOD (DAYS) | | | | | |
|---|---|---|---|---|---|---|
|  | 0 | 1 | 3 | 5 | 7 | 11 |
| Tensile Strength (psi) | 7013 | 6172 | 6142 | 6287 | 6213 | 5735 |
| Elongation (% at 10 inches per minute strain) | 187 | 175 | 175 | 162 | 162 | 150 |

EXAMPLE X

Ethylene-tetrafluoroethylene copolymer powder (2000 g.) was blended with 100 g. of liquid diallyl brassylate in a Henschel Mixer and the blended composition was passed through a Brabender Extruder at a linear 460° F profile to obtain a rod which was then pelletized. The pellets were then tube extruded in a 0.115 inch wall onto a 0.036 inch diameter conductor of 19 strands of tinned copper in a 1 inch Davis Extruder with a temperature profile of 530°, 570° and 620° F across the barrel, head and die respectively. The insulated wire was then irradiated to an absorbed dose of 10 megarads under a 1.5 MEV electron beam accelerator and, subsequently heated for 20 minutes at 200° C.

The insulation had a tensile strength of 6136 psi, yield point at 4464 psi, and elongation of 150% — all at 20 inches strain per minute. The wire, in a vertical flame test was immediately self-extinguishing. Adjacent turns on a mandrel at 200° C for 6 hours exhibited no blocking. Insulation resistance was greater than 500,000 megohms per thousand feet. No cracking or dielectric failure was found after a "life cycle" test xposure of a 2 foot section kept suspended over a 0.75 inch mandrel with a 0.75 pound weights at 200° C for 168 hours. Bend and dielectric tests were also satisfactory for a 1 foot section with a 1 pound weight was repeatedly wound up and down again over a 0.75 inch mandrel at 2 rpm in a cold box maintained at −65° F for 4 hours.

EXAMPLE XI

To illustrate the preparation of another polymeric composition utilizable in accordance with the present invention, ethylene-chlorotrifluoroethylene was powder blended with 5% by weight of the diallyl ester of 2,6-dibutyl pimelic acid prepared in accordance with the procedure of Example IV. The blend was compression molded at 490° F and irradiated to a 10 megarad dose under a 1.5 MEV electron beam accelerator to produce a crosslinked polymeric composition having the following mechanical properties:

|  | 70° F | 250° C |
|---|---|---|
| Tensile Strength (psi) | 6750 | 190 |
| Elongation (%) | 190 | 160 |
| Hot Modulus (%, 250° C, 50 psi) | — | 42 |

EXAMPLE XII

In accordance with the procedure of Example XI, a polymeric composition was prepared by powder blending 5% by weight diallyl ester of 2,6-dibenzyl pimelic acid from Example V with ethylene-chlorotrifluoroethylene copolymer. The blended composition was then compression molded at 490° F and irradiated to a 10 megarad dose under a 1.5 MEV electron beam accelerator to produce a cross-linked polymeric composition having the following mechanical properties:

|  | 70° F | 250° C |
|---|---|---|
| Tensile Strength (psi) | 6800 | 185 |
| Elongation (%) | 180 | 145 |
| Hot Modulus (%, 250° C, 50 psi) | — | 45 |

EXAMPLE XIII

A powder blend was prepared including 5% by weight of a diallyl ester of bis (bicyclohexyl carboxylic acid) and an ethylene-tetrafluoroethylene copolymer. The blended composition was then compression molded at 510° F and irradiated under a 1.5 MEV electron beam accelerator to a dose of 10 megarads. The following properties were obtained in the resulting crosslinked polymeric composition:

|  | 70° F | 250° C | 275° C |
|---|---|---|---|
| Tensile Strength (psi) | 5800 | 510 | — |
| Elongation (%) | 210 | 280 | — |
| Hot Modulus (%, 275° C, 50 psi) | — | — | 38 |

Obviously, many modifications and variations of the invention as hereinbefore set forth may be made without departing from the spirit and scope thereof, therefore, only such limitations should be imposed as are indicated in the appended claims.

We claim:
1. A wire product having an extruded insulation coating thereon, said extruded coating comprising a high temperature processing fluorocarbon homopolymer or copolymer selected from the group consisting of polymers and copolymers of ethylene-tetrafluoroethylene, ethylene-chlorotrifluoroethylene, vinylidene fluoride, tetrafluoroethylene-vinylidene fluoride, tetrafluoroethylene-hexafluoropropylene, vinylidene fluoride-hexafluoropropylene, vinylidene fluoride-hexafluoropropylene-tetrafluoroethylene and mixtures thereof having incorporated therein a crosslinking coreactant compound comprising a diallyl ester having the structural formula:

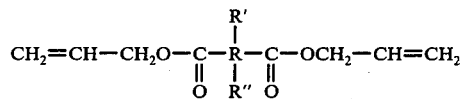

wherein R is an organic radical consisting from 4 to 20 carbon atoms and is selected from the group consisting of alkyl radicals, cycloalkyl radicals and mixed alkyl-cycloalkyl radicals; R' and R" are independently selected from hydrogen, alkyl, cycloalkyl, aralkyl and aryl radicals and mixtures thereof; and the total carbon atoms in R, R' and R" is from 10 to 34.

2. The wire product of claim 1, wherein said extruded coating is irradiation crosslinked.

* * * * *